(12) United States Patent
Chuu

(10) Patent No.: US 11,317,315 B2
(45) Date of Patent: *Apr. 26, 2022

(54) VIRTUAL-MACHINE DATAPLANE HAVING FIXED INTERPACKET TIME

(71) Applicant: ARRIS Enterprises LLC, Suwanee, GA (US)

(72) Inventor: Wayne Chuu, Saratoga, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/793,608

(22) Filed: Feb. 18, 2020

(65) Prior Publication Data

US 2020/0187045 A1    Jun. 11, 2020

Related U.S. Application Data

(63) Continuation of application No. 15/751,161, filed as application No. PCT/US2015/067512 on Dec. 22, 2015, now Pat. No. 10,609,592.

(Continued)

(51) Int. Cl.
*H04L 12/26* (2006.01)
*H04W 28/02* (2009.01)
(Continued)

(52) U.S. Cl.
CPC .... *H04W 28/0268* (2013.01); *G06F 9/45533* (2013.01); *G06F 9/45558* (2013.01);
(Continued)

(58) Field of Classification Search
CPC .............. H04W 28/0268; H04W 28/10; G06F 9/45533; G06F 9/45558; H04L 45/38
See application file for complete search history.

(56) References Cited

U.S. PATENT DOCUMENTS

2002/0141339 A1    10/2002  Konuma
2008/0148341 A1    6/2008   Ferguson
(Continued)

FOREIGN PATENT DOCUMENTS

WO    2014142723 A1    9/2014

OTHER PUBLICATIONS

International Search Report and Written Opinion, PCT/US2015/067512, dated Jun. 3, 2016.
(Continued)

*Primary Examiner* — Siren Wei
(74) *Attorney, Agent, or Firm* — Steven Stupp; Stewart Wiener

(57) ABSTRACT

In order to provide flexible scaling and dynamic reconfiguration, a wireless local area network controller includes a virtual dataplane with one or more virtual machines. These virtual machines pre-calculate processing parameters for packets in a data flow. For example, the pre-calculated processing parameters may include: encapsulation parameters, quality-of-service parameters and priority parameters. Subsequently, when one of the virtual machines receives a packet in the data flow on an input port, the virtual machine modifies information in a header of the packet based on one or more of the pre-calculated processing parameters and information associated with the data flow (which specifies the one or more pre-calculated processing parameters). Then, the virtual machine transmits the packet on an output port. In this way, the virtual machine maintains a fixed inter-packet time between packets in the data flow.

20 Claims, 8 Drawing Sheets

Related U.S. Application Data

(60) Provisional application No. 62/207,816, filed on Aug. 20, 2015.

(51) Int. Cl.
*H04L 45/00* (2022.01)
*H04L 47/2425* (2022.01)
*H04L 45/586* (2022.01)
*G06F 9/455* (2018.01)
*H04L 45/745* (2022.01)
*H04L 47/2483* (2022.01)
*H04L 49/00* (2022.01)

(52) U.S. Cl.
CPC ............ *H04L 45/38* (2013.01); *H04L 45/586* (2013.01); *H04L 45/745* (2013.01); *H04L 47/2433* (2013.01); *H04L 47/2483* (2013.01); *H04L 49/3063* (2013.01); *G06F 2009/4557* (2013.01); *G06F 2009/45587* (2013.01); *G06F 2009/45595* (2013.01)

(56) References Cited

U.S. PATENT DOCUMENTS

| | | |
|---|---|---|
| 2012/0304175 A1 | 11/2012 | Damola |
| 2014/0079170 A1* | 3/2014 | Le Houerou ............ H04L 47/30 375/371 |
| 2014/0181818 A1* | 6/2014 | Vincent ............... G06F 9/45533 718/1 |
| 2014/0233571 A1 | 8/2014 | Pope et al. |
| 2014/0269319 A1* | 9/2014 | DeCusatis ............... H04L 47/12 370/236 |
| 2014/0355977 A1* | 12/2014 | Bjornstad .......... H04Q 11/0066 398/25 |
| 2015/0016266 A1 | 1/2015 | Dumitrescu |
| 2015/0188780 A1 | 7/2015 | Spieser |
| 2016/0182336 A1* | 6/2016 | Doctor .................. H04L 43/062 709/224 |

OTHER PUBLICATIONS

Extended European Search Report, European Patent Application No. 15901871.2, dated Mar. 15, 2019.

* cited by examiner

VIRTUAL-MACHINE DATAPLANE HAVING FIXED INTERPACKET TIME

CROSS REFERENCE TO RELATED APPLICATIONS

This application is a continuation of U.S. Nonprovisional patent application Ser. No. 15/751,161, "Virtual-Machine Dataplane Having Fixed Interpacket Time," by Wayne Chuu, filed on Feb. 7, 2018, which claims priority under 35 U.S.C. 371 to International Patent Application No. PCT/US15/67512, "Virtual-Machine Dataplane Having Fixed Interpacket Time," by Wayne Chuu, filed on Dec. 22, 2015, and which claims priority to U.S. Provisional Patent Application No. 62/207,816, "Virtual-Machine Dataplane Having Fixed Interpacket Time," by Wayne Chuu, filed on Aug. 20, 2015, the contents of each of which are herein incorporated by reference.

BACKGROUND

Field

The described embodiments relate to techniques for communicating information among electronic devices, including communicating information with a controller using a dataplane with virtual machines having a fixed inter-packet time.

Related Art

High-speed interfaces are often implemented using dedicated hardware, such as field-programmable gate arrays (FPGAs) or application-specific integrated circuits (ASICs). While such dedicate hardware can offer predictable high performance, it is often time-consuming and difficult to design dedicated hardware. For example, designing an ASIC often requires a large design team, multiple chip fabrications over more than a year and, thus, considerable expense.

In contrast, software projects can typically be achieved in less time, with lower cost and more flexibility, but typically lack the predictable data-transfer speeds over hardware interfaces governed by firmware FPGAs. However, other performance metrics of such a software implementation are often poorer than the performance of dedicated hardware. For example, because of computational variations the time required to process a packet in an interface can vary. Consequently, the data rate and parameters such as the inter-packet time can vary considerably as a function of time. These variations can degrade the performance of a software implementation, which can make a software implementation unsuitable in many applications.

SUMMARY

The described embodiments relate to a controller that processes packets in a virtual dataplane with one or more virtual machines in the controller. This controller includes: an interface circuit that, during operation, communicates with one or more access points; a processor; and a memory that stores a program module, which is executed by the processor, with instructions for a virtual dataplane with one or more virtual machines. During operation, a given virtual machine pre-calculates processing parameters for packets in a data flow. Then, the given virtual machine stores the pre-calculated processing parameters in the memory. Moreover, the given virtual machine receives a given packet in the data flow on an input port. Next, the given virtual machine processes the given packet by accessing the stored pre-calculated processing parameters stored in the memory based on information associated with the data flow, where processing the given packet involves modifying information in a header of the given packet based on one or more of the pre-calculated processing parameters. After the processing, the given virtual machine transmits the given packet on an output port, where the given virtual machine maintains a fixed inter-packet time between packets in the data flow.

Note that the given virtual machine may be executed by a preconfigured number of cores in the processor.

Moreover, the pre-calculated processing parameters may be based on one or more link performance metrics. Furthermore, the pre-calculated processing parameters may be calculated at a beginning of the data flow and/or after a time interval has elapsed. In some embodiments, the pre-calculated processing parameters include: an encapsulation parameter, a quality-of-service parameter and a priority parameter.

Additionally, the inter-packet time between the packets at the input port may equal the inter-packet time between the packets at the output port.

In some embodiments, the processing in the given virtual machine is implemented using multiple parallel pipelines, so that multiple packets in the data flow are processed concurrently.

Another embodiment provides a computer-program product for use with the controller. This computer-program product includes instructions for at least some of the operations performed by the given virtual machine.

Another embodiment provides a method. This method includes at least some of the operations performed by the given virtual machine.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to provide flexible scaling and dynamic reconfiguration, a wireless local area network (WLAN) controller (which is sometimes referred to as a 'controller' or a 'WLC') includes a virtual dataplane with one or more virtual machines. These virtual machines pre-calculate processing parameters for packets in a data flow. For example, the pre-calculated processing parameters may include: encapsulation parameters, quality-of-service parameters and priority parameters. Subsequently, when one of the virtual machines receives a packet in the data flow on an input port, the virtual machine modifies information in a header of the packet based on one or more of the pre-calculated processing parameters and information associated with the data flow (which specifies the one or more pre-calculated processing parameters). Then, the virtual machine transmits the packet on an output port.

Because the processing parameters do not need to be determined in real time (i.e., while the packets are being processed), the controller may provide improved communication performance with predictability. For example, the virtual machine may maintain a fixed inter-packet time between packets in the data flow even at high data rates. In particular, the inter-packet time at the input to the virtual machine may equal the inter-packet time at the output. This capability may maintain the packet latency (i.e., the time span of packet entering the controller and then leaving the controller) as a constant regardless of the traffic utilization in the system. Consequently, the communication technique may improve the user experience when using the controller, which may improve sales and customer loyalty.

In the discussion that follows, the electronic device may include a radio that communicates packets in accordance with a communication protocol, such as an Institute of Electrical and Electronics Engineers (IEEE) 802.11 standard (which is sometimes referred to as 'Wi-Fi,' from the Wi-Fi Alliance of Austin, Tex.), Bluetooth (from the Bluetooth Special Interest Group of Kirkland, Wash.), and/or another type of wireless interface. In the discussion that follows, Wi-Fi and Ethernet are used as an illustrative example. However, a wide variety of communication protocols may be used.

Figure 1:
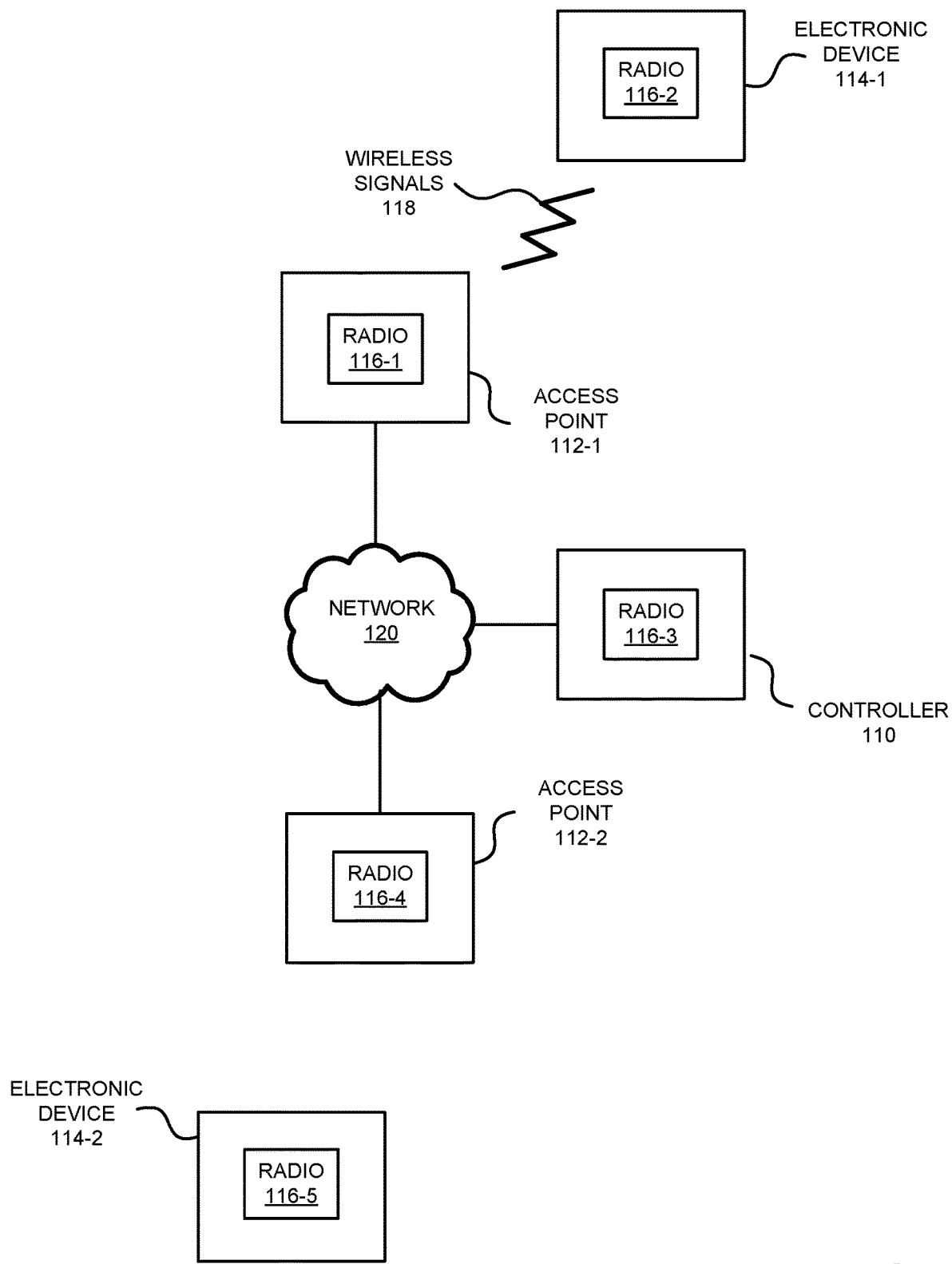
FIG. 1 is a block diagram illustrating electronic devices wirelessly communicating in accordance with an embodiment of the present disclosure.

Communication among electronic devices is shown in FIG. 1, which presents a block diagram illustrating a controller 110, access points 112 and electronic devices 114 (such as computers, portable electronic devices, e.g., cellular telephones, etc.) wirelessly communicating according to some embodiments. In particular, access points 112 and electronic devices 114 may wirelessly communicate while: transmitting advertising frames on wireless channels, detecting one another by scanning wireless channels, establishing connections (for example, by transmitting association requests), and/or transmitting and receiving packets (which may include the association requests and/or additional information as payloads). In addition, controller 110 and access points 112 may communicate via network 120, which, in general, may involve wired and/or wireless communication.

Figure 8:
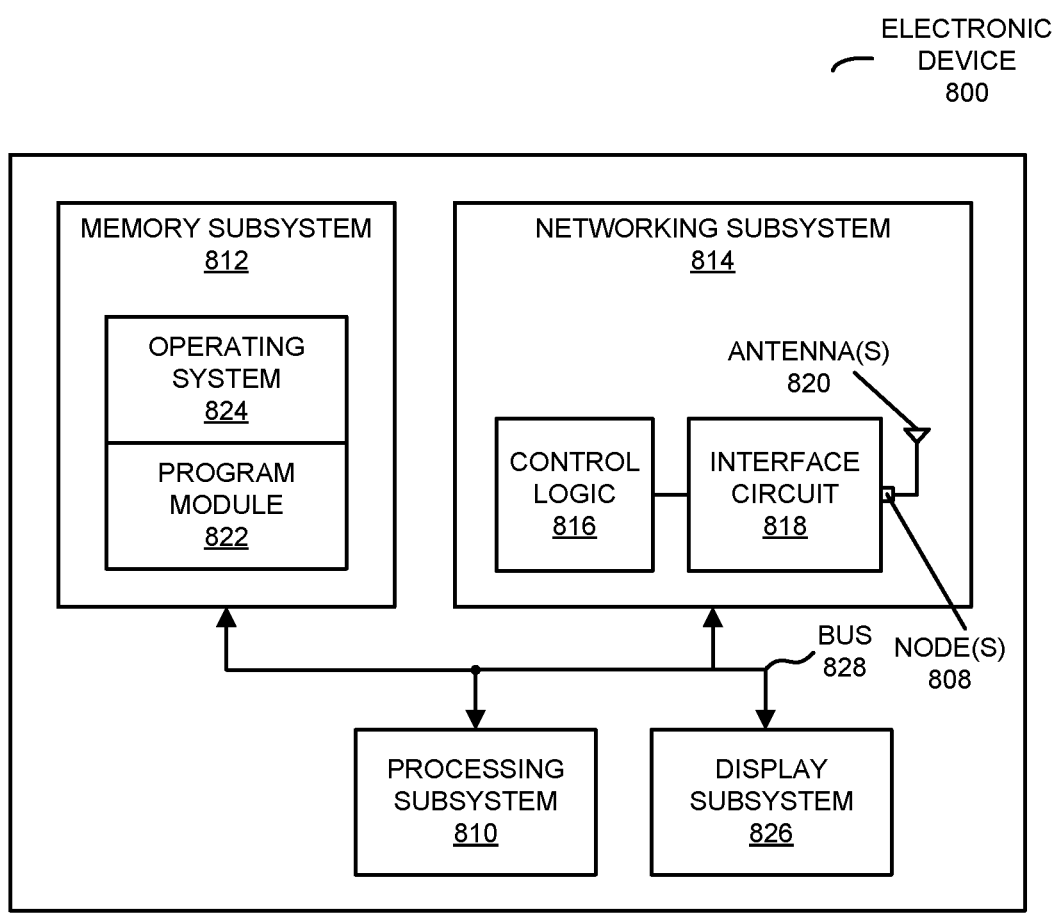
FIG. 8 is a block diagram illustrating a controller in accordance with an embodiment of the present disclosure.

As described further below with reference to FIG. 8, controller 110, access points 112 and electronic devices 114 may include subsystems, such as a networking subsystem, a memory subsystem and a processor subsystem. In addition, controller 110, access points 112 and/or electronic devices 114 may include radios 116 in the networking subsystems. More generally, controller 110, access points 112 and/or electronic devices 114 can include (or can be included within) any electronic devices with the networking subsystems that enable access points 112 and electronic devices 114 to wirelessly communicate with each other. This wireless communication can comprise transmitting advertisements on wireless channels to enable electronic devices to make initial contact or detect each other, followed by exchanging subsequent data/management frames (such as association requests and responses) to establish a connection, configure security options (e.g., Internet Protocol Security), transmit and receive packets or frames via the connection, etc. Note that while instances of radios 116 are shown in controller 110, access points 112 and electronic devices 114, one or more of these instances may be different from the other instances of radios 116.

As can be seen in FIG. 1, wireless signals 118 (represented by jagged lines) are transmitted from radio 116-1 in access point 112-1. These wireless signals 118 may be received by radios 116 in one or more of controller 110 and/or electronic devices 114 (such as electronic device 114-1). In particular, access point 112-1 may transmit packets. In turn, these packets may be received by the one or more of controller 110 and/or electronic devices 114. Moreover, as described further below, controller 110 may configure and/or allow access points 112 to communicate with other electronic devices, computers and/or servers via network 120.

Note that the communication between controller 110, access points 112 and/or electronic devices 114 may be characterized by a variety of performance metrics, such as: a received signal strength (RSS), a data rate, a data rate for successful communication (which is sometimes referred to as a 'throughput'), an error rate (such as a retry or resend rate), a mean-square error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Figure 2:
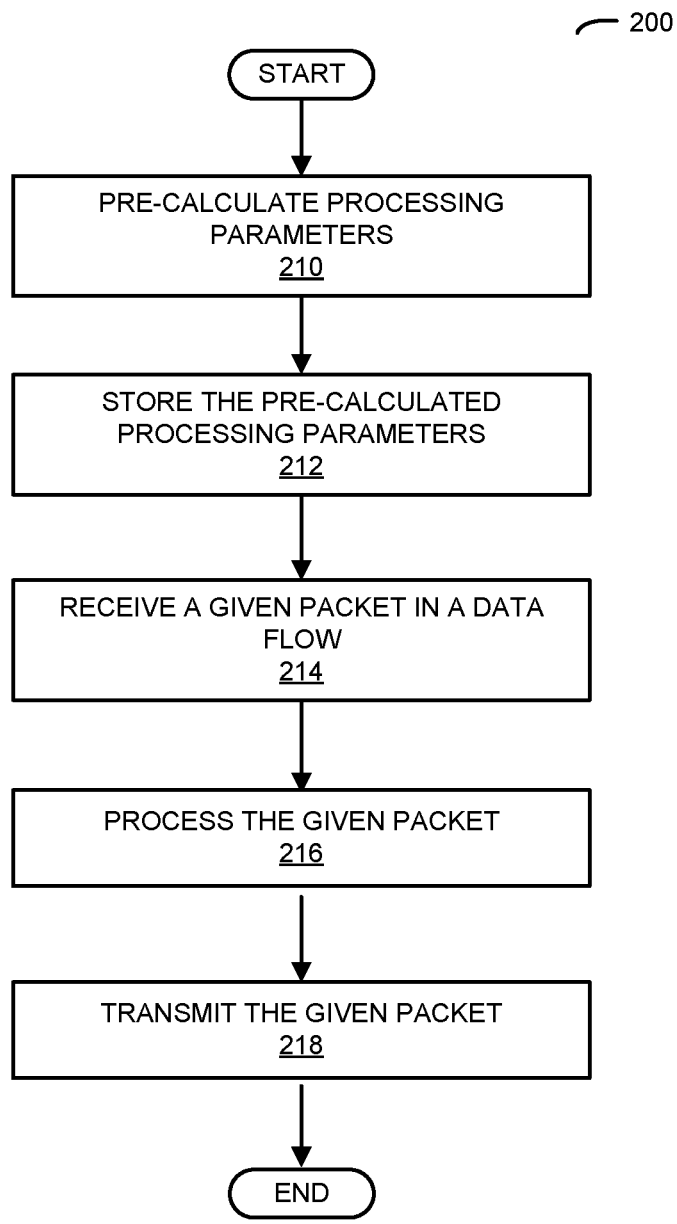
FIG. 2 is a flow diagram illustrating a method for processing packets in a virtual dataplane with one or more virtual machines in a controller in accordance with an embodiment of the present disclosure.

As discussed further below with reference to FIGS. 2 and 3, in the communication technique, controller 110 may perform at least some of the operations in the communication technique.

In the described embodiments, processing a packet or frame in controller 110, access points 112 and/or and electronic devices 114 includes: receiving wireless signals 118 with the packet or frame; decoding/extracting the packet or frame from received wireless signals 118 to acquire the packet or frame; and processing the packet or frame to determine information contained in the packet or frame.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

We now describe embodiments of the method. FIG. 2 is a flow diagram illustrating a method 200 for processing packets in a virtual dataplane with one or more virtual machines in a controller according to some embodiments, which may be performed by controller 110 in FIG. 1. During operation, a given virtual machine in the controller pre-calculates processing parameters (operation 210) for packets in a data flow. For example, the pre-calculated processing parameters may be based on one or more link performance metrics. In some embodiments, the pre-calculated processing parameters include: an encapsulation parameter, a quality-of-service parameter and a priority parameter. Note that the pre-calculated processing parameters may be calculated at a beginning of the data flow and/or after a time interval has elapsed.

Then, the given virtual machine stores the pre-calculated processing parameters (operation 212) in the memory.

Moreover, the given virtual machine receives a given packet in the data flow (operation 214) on an input port. Next, the given virtual machine processes the given packet (operation 216) by accessing the stored pre-calculated processing parameters stored in the memory based on information associated with the data flow (such as the source Internet Protocol or IP address, the destination IP address, the IP protocol, the layer 4 or L4 source port number, and/or the destination port number), and modifying information in a header of the given packet (such as information specifying a generic routing encapsulation or GRE tunnel) based on one or more of the pre-calculated processing parameters.

After the processing (operation 216), the given virtual machine transmits the given packet (operation 218) on an output port, where the given virtual machine maintains a fixed inter-packet time between packets in the data flow. Thus, the inter-packet time between the packets at the input port may equal the inter-packet time between the packets at the output port.

Note that the given virtual machine may be executed by a preconfigured number of cores in the processor. In some embodiments, the processing in the given virtual machine is implemented using multiple parallel pipelines, so that multiple packets in the data flow are processed concurrently.

In some embodiments of method 200, there may be additional or fewer operations. Moreover, the order of the operations may be changed, and/or two or more operations may be combined into a single operation.

Figure 3:
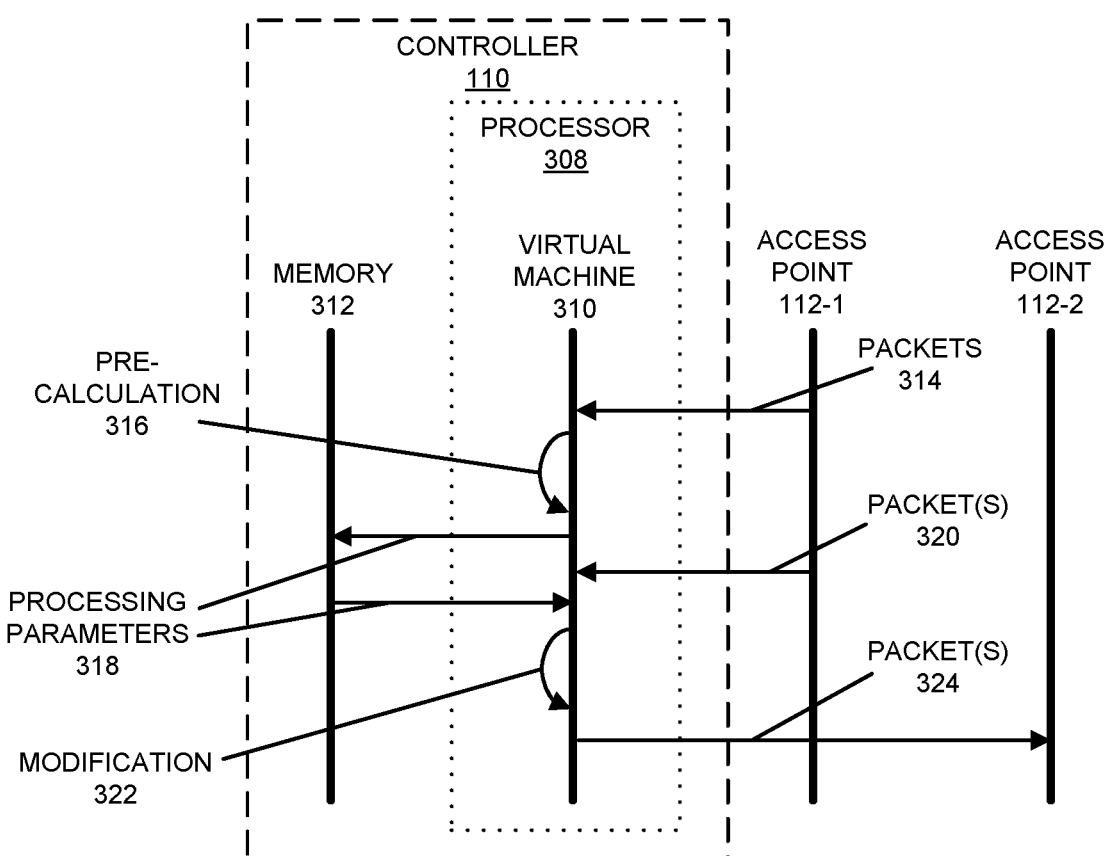
FIG. 3 is a drawing illustrating operation of the controller in FIG. 1 in accordance with an embodiment of the present disclosure.

Embodiments of the communication technique are further illustrated in FIG. 3, which presents a drawing illustrating communication among controller 110 and access points 112-1 and 112-2 according to some embodiments. In particular, controller 110 may receive packets 314 in a data flow from access point 112-1. Then, a virtual machine 310 executing on a processor 308 in controller 110 pre-calculates 316 processing parameters 318 for packets 314 in the data flow based on one or more link performance metrics, and stores processing parameters 318 in memory 312.

Then, virtual machine 310 receives one or more packets 320 in the data flow on an input port. Next, virtual machine 310 processes the one or more packets 320 by accessing processing parameters 318 stored memory 312 based on information associated with the data flow, and modifying 322 information in a header of the one or more packets 320 based on processing parameters 318. After the processing, virtual machine 310 transmits the one or more packets 324 on an output port, e.g., to access point 112-2, where virtual machine 310 maintains a fixed inter-packet time between the one or more packets 320 and 324 in the data flow.

In an exemplary embodiment of the communication technique, the controller includes a flexible, high-performance dataplane (such as a dataplane with a high data rate, e.g., 10-40 Gbps). Note that the dataplane is generally responsible for moving data around transmit paths, while a control plane is generally responsible for determining and setting up those transmit paths. The dataplane may be implemented using virtual machines that are executed by multiple cores in one or more processors, which allows the dataplane to be flexibly scaled and dynamically reconfigured. (Note that in the discussion that follows, a virtual machine is an operating system or application environment that is implemented using software that imitates or emulates dedicated hardware or particular functionality of the dedicated hardware.) In addition, a given virtual machine includes a flow module that pre-calculates processing parameters used for processing packets in a particular flow. For example, the pre-calculated processing parameters may include: encapsulation parameters, access control list for packet filtering, quality-of-service parameters, priority parameters, traffic re-direct, and/or egress port selection through from various table lookup (such as a routing table, an address resolution protocol table or a bridging table). The pre-calculated processing parameters may be stored in a look-up table in a computer-readable memory for quick access when a packet is received. Note that the pre-calculated processing parameters may be calculated at the start of a data flow and/or refresh after a periodic time interval has elapsed (such as 1, 2, 5 or 10 s) to accommodate a dynamic table change or a configuration data change.

When a packet is received, information associated with the packet is used to look-up the associated pre-calculated processing parameters. Then, the packet is modified, as needed, based on these pre-calculated processing parameters using a pipeline with a fixed number of instructions. In order to achieve a fixed number of instructions in processing a packet, a flow module may be used. This flow module may build the pre-calculated processing parameters under complicated or less-complicated configurations, or with a table size in the background, such that, when a subsequent flow packet arrives, it does not have to go through the same process again. Instead, using available and accurate information, the packet may be processed and forwarded promptly. Moreover, multiple packets may be concurrently processed in this way using parallel pipelines. Consequently, the controller may offer high-performance with predictability, such as a fixed inter-packet time (or inter-packet gap) and fixed and minimum-delayed packet latency. In particular, the inter-packet time at the input to the given virtual machine may equal the inter-packet time at the output. This capability may maintain the packet latency (i.e., the time span of packet entering the controller and then leaving the controller) as a constant regardless of the traffic utilization in the system.

In general, the controller may include a hardware and/or a software implementation of a controller for multiple access points. Moreover, the controller may be accessible via a network, such as the Internet and/or an intranet (such as a cloud-based controller that executes on one or more servers, e.g., one or more cloud-based servers). Furthermore, a variety of processors may be used to execute a dataplane module that provides the virtual machine(s) in the dataplane. In some embodiments, a given access point communicates with the controller using wired communication protocol (such as IEEE 802.3, which is sometimes referred to as 'Ethernet,' such as an Ethernet II standard) and/or a wireless communication protocol (such as IEEE 802.11, which is sometimes referred to as 'Wi-Fi' from the Wi-Fi Alliance of Austin, Tex.). However, a wide variety of communication techniques or protocols may be used.

Figure 4:
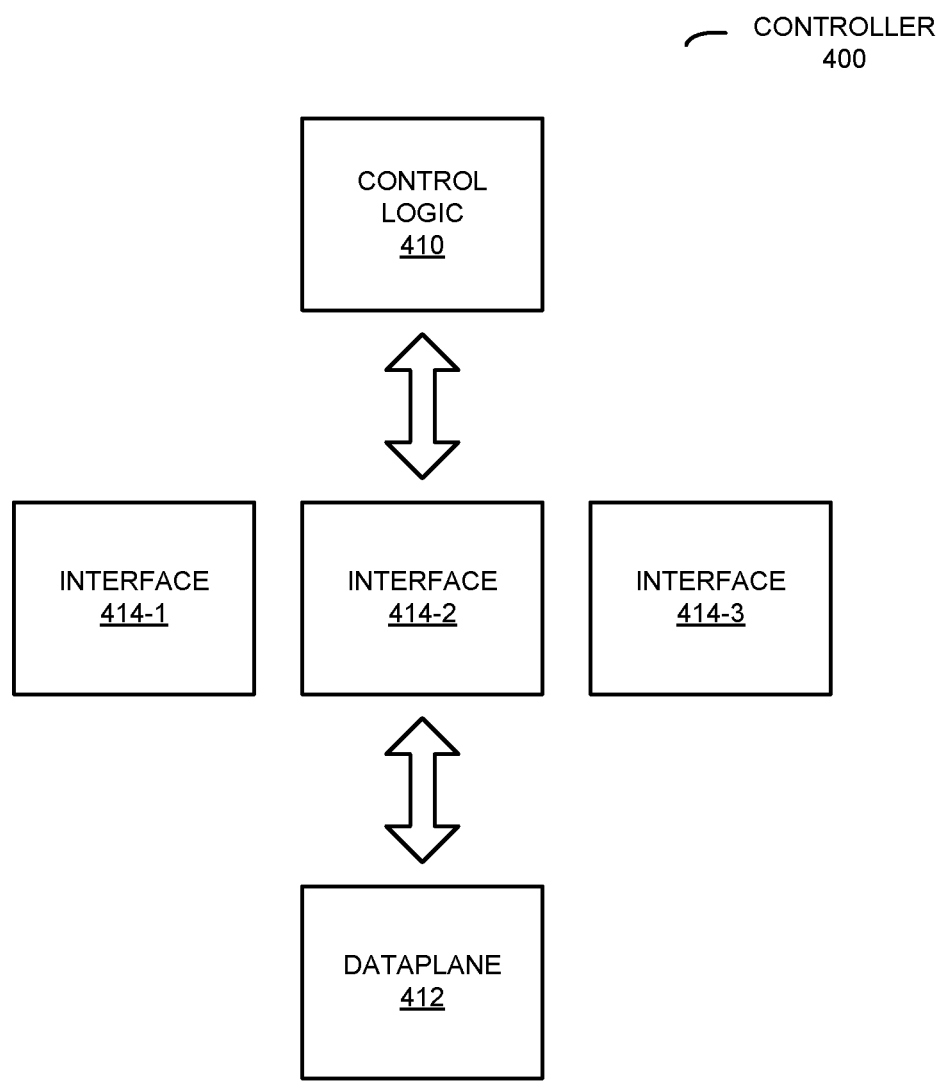
FIG. 4 is drawing illustrating a controller in accordance with an embodiment of the present disclosure.

FIG. 4 presents a drawing illustrating a controller 400 according to some embodiments. This controller may include control logic 410 (such as one or more processors) in a control plane that is used to control traffic or communication with multiple access points. Note that control logic 410 may handle automatic adjustments to the parameters of an access point, such as radio-frequency power, channels, authentication, and security. In addition, controller 400 may include a fast, deterministic dataplane 412 that processes data that is received from one or more access points via a network (such as the Internet, a wireless network, a cellular-telephone network and/or an intranet). For example, the data may be aggregated into an encryption format before being output onto a network. As shown in FIG. 4, control logic 410 or control plane (which may be implemented using a control blade or c-blade) and dataplane 412 (which may be implemented using a blade or d-blade) may communicate with each other via one or more interfaces 414 (such as a kernel NIC or KNI interface, or a peripheral component interconnect or PCI interface) in controller 400. For example, the one or more interfaces 414 may allow dataplane 412 to obtain configuration information and to provide statistical information to control logic 410.

Figure 5:
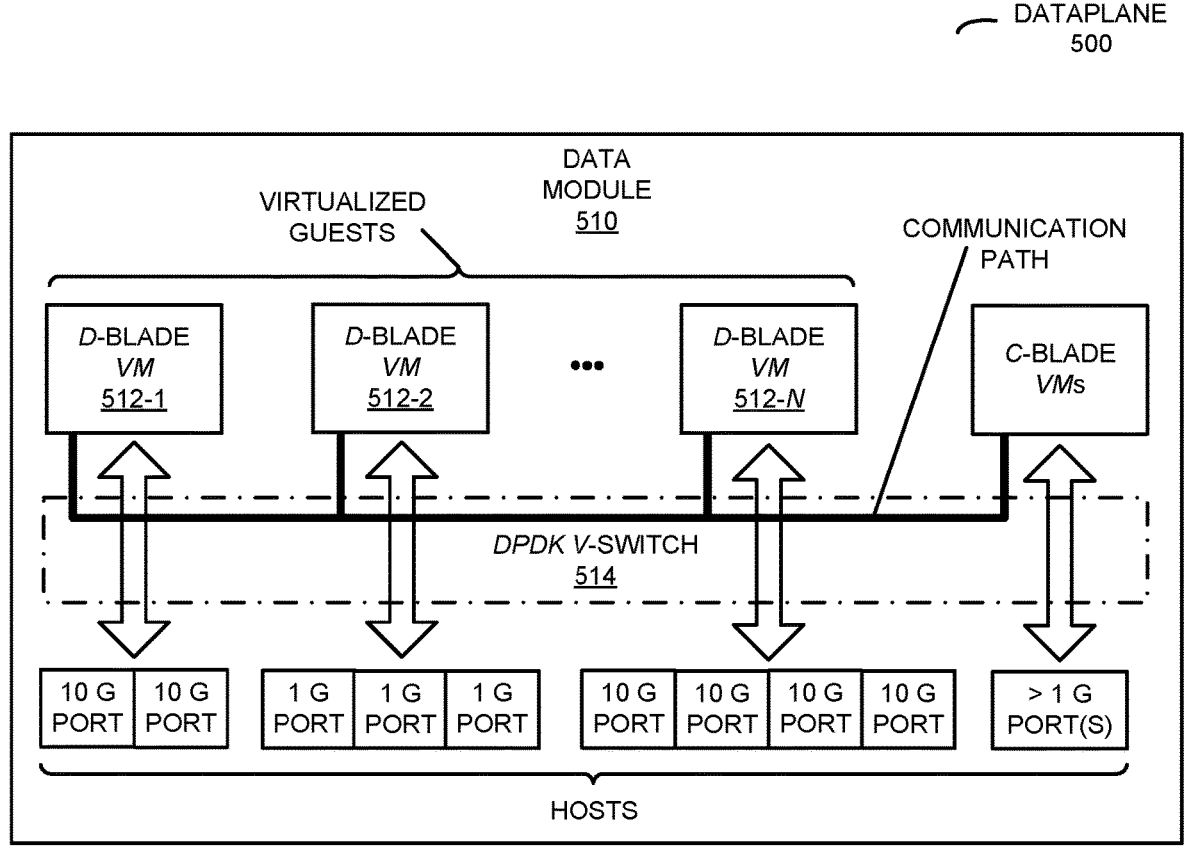
FIG. 5 is a drawing illustrating a dataplane in the controller of FIG. 4 in accordance with an embodiment of the present disclosure.

As shown in FIG. 5, which presents a drawing illustrating a dataplane 500 according to some embodiments, dataplane 500 may be implemented using a dataplane module 510. This dataplane module may include one or more virtual machines (VMs) 512 that are executed by one or more cores in one or more processors (such as 3-6 cores in a processor). For example, VM 512-1 may include two 10 G ports (which are interfaced via a dataplane development kit virtual switch or DPDK V switch 514, VM 512-2 may include three 1 G ports, and VM 512-3 may include four 10 G ports. In this way, dataplane 500 can be dynamically reconfigured and the performance can be scaled, e.g., by allocating more cores to execute a particular virtual machine. Note that, in general, an access point may roam across dataplane 500 and may choose one of virtual machines 512 with a guaranteed performance (include a fixed inter-packet time).

Figure 6:
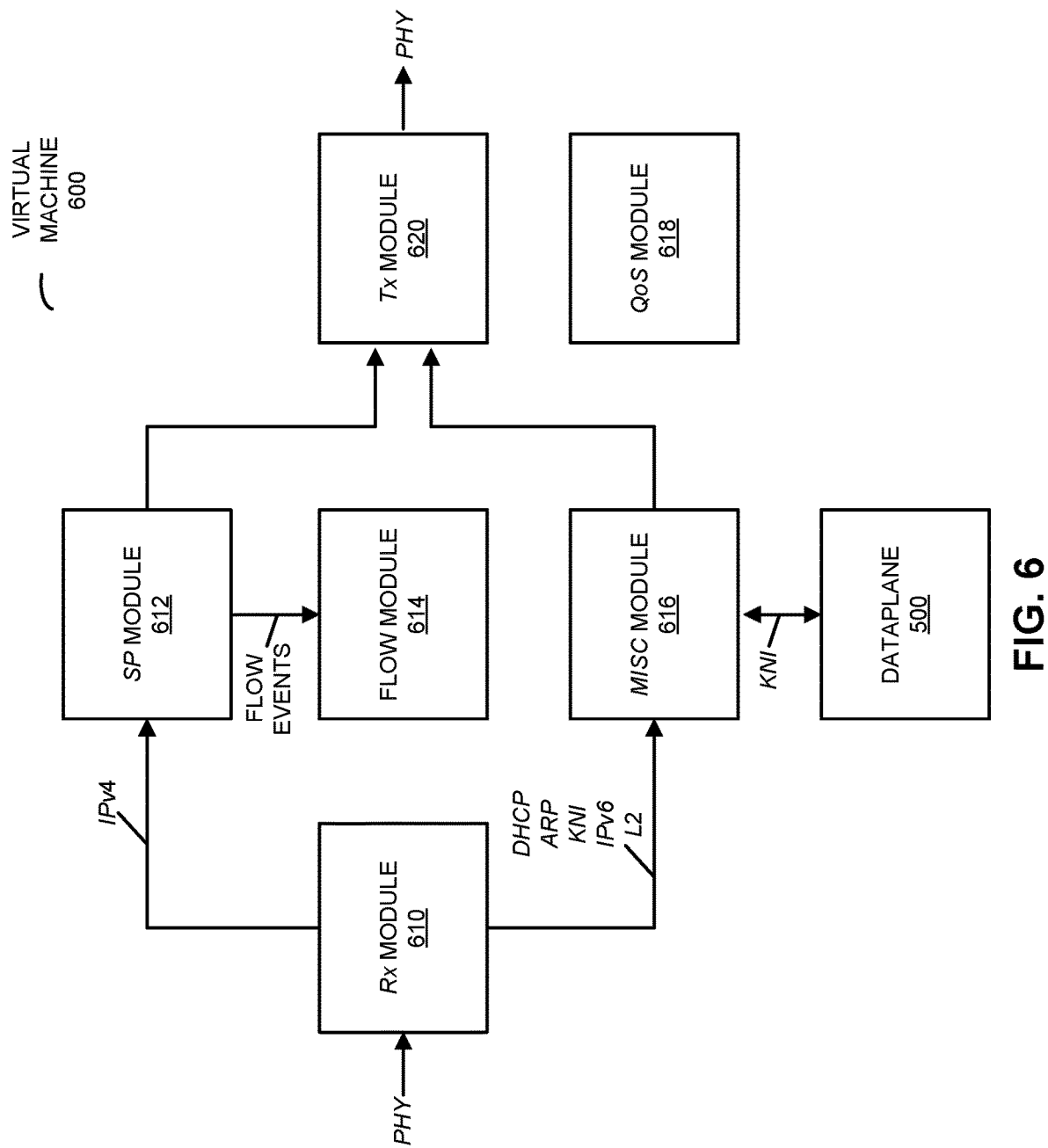
FIG. 6 is a drawing illustrating the functionality or modules in a given virtual machine in the controller of FIG. 4 in accordance with an embodiment of the present disclosure.

FIG. 6 presents a drawing illustrating the functionality or modules in a virtual machine 600 according to some embodiments. In particular, a receive (Rx) module 610 receives packets in flows from one or more physical ports that are coupled to a network (such as the Internet, a wireless network, a cellular-telephone network and/or an intranet). Moreover, receive module 610 may provide high-data-rate flows to software-processing 612 module (SP module) and low-data-rate flows to miscellaneous (MISC) module 616. Note that miscellaneous module 616 may process the packets in the low-data-rate flows and may communicate, via an interconnect 414, with control logic 410 in controller 400 in FIG. 4. In addition, miscellaneous module 616 may determine quality-of-service (QoS) parameters using a QoS module 618, and may output packets on the same or another network (such as the Internet, a wireless network, a cellular-telephone network and/or an intranet) via transmit (Tx) module 620.

Software-processing module 612 may process the packets in the high-data-rate flows and, after processing, may output packets via transmit module 620. In order to process packets deterministically with a fixed number of instructions or operations in a pipeline and, thus, with a fixed (or guaranteed) inter-packet time, software-processing module 612 may use a look-up table with pre-calculated entries, such as processing parameters, which are determined by flow module 614. For example, the look-up table may include: egress tunnel encapsulation, quality-of-service parameters, priorities of transmit packets, and/or egress port selection through from various lookup tables (such as a routing table, an address resolution protocol table and/or a bridging table). More generally, the look-up table may include pre-calculated and/or pre-defined information that, during operation, is used by virtual machine 600 to process packets in a flow. Note that the pre-calculated processing parameters may be calculated at the start of a data flow and/or after a time interval has elapsed (such as 1, 2, 5 or 10 s) since a previous instance of calculating the processing parameters. Because the look-up table with the pre-calculated processing parameters eliminates the need for calculating the processing parameters as packets are received (which, in general, can take a variable amount of time), dataplane 500 can provide deterministic performance (such as high data rates and/or a fixed inter-packet time with minimum-delayed packet latency. Thus, dataplane 500 may be substantially more than a software implementation of hardware.

In an exemplary embodiment, the processing of packets includes de-encapsulation and encapsulation. For example, software-processing module 612 may receive packets with information specifying a generic routing encapsulation (GRE) tunnel included in headers. Moreover, software-processing module 612 may use information associated with the packets (such as the source Internet Protocol or IP address, the destination IP address, the IP protocol, the layer 4 or L4 source port number, and/or the destination port number) to look up pre-calculated information specifying a layer 2 (L2) GRE tunnel. Then, software-processing module 612 may swap or replace the information in the packets specifying the GRE tunnel with the information specifying the L2 GRE tunnel (the appropriate pre-selected egress interface), and may output or provide the modified packets to transmit module 620. Once again, by leveraging pre-calculated processing parameters, software-processing module 612 can provide deterministic performance. Said differently, by pre-calculating the processing parameters and preparing the look-up table, flow module 614 allows software-processing module 612 to subsequently leverage this information during the processing of packets to achieve the deterministic performance.

Figure 7:
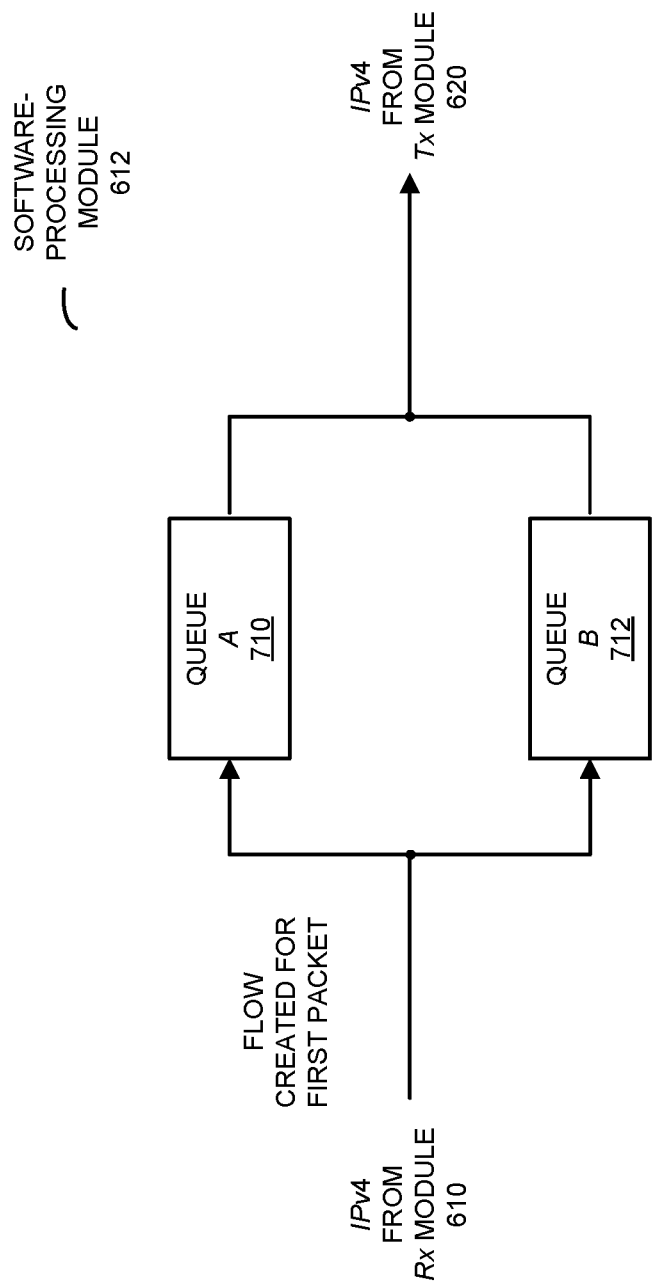
FIG. 7 is a drawing illustrating a software-processing module in the controller of FIG. 4 in accordance with an embodiment of the present disclosure.

Alternatively or additionally, as illustrated in FIG. 7, which presents a drawing of software-processing module 612 according to some embodiments, in a non-limiting example, there may be multiple users of controller 400 in FIG. 4 (with associated data flows). A first user may pay a higher fee to obtain higher-performance service than a second user, who may have a regular-performance service. However, there may be a high volume of traffic in one or more data flows associated with the second user. If one or more link performance metrics (such as the link capacity or utilization) are degraded or resource constrained, the pre-calculated processing parameters may indicate that, for purposes of quality-of-service, packets associated with the first user may have a higher priority than packets associated with the second user. In these embodiments, software-processing module 612 may look up quality-of-service and/or priority parameters for packets from the first user, and may include information specifying the priority of these packets in their headers. Then, software-processing module 612 may output or provide the modified packets to transmit module 620 (FIG. 6).

In circumstances where the one or more link performance metrics are degraded below a threshold (such as when there is insufficient link capacity to handle the packets from the first user and the packets from the second user), the pre-calculated processing parameters may indicate that software-processing module 612 delay or drop packets associated with the second user.

Note that a wide variety of link performance metrics may be used by flow module 614 to pre-calculate one or more of the processing parameters, including one or more of the performance metrics described previously.

As shown in FIG. 7, in some embodiments software-processing module 612 concurrently processes multiple packets using parallel pipelines. Each of these pipelines may perform a fixed number of instructions or operations, including looking up pre-calculated processing parameters that are stored in a computer-readable memory.

In these ways, controller 400 (FIG. 4) may provide high performance and a fixed inter-packet time while leveraging a software-implementation of dataplane 500 in FIG. 5 (including the uses of one or more virtual machines). For example, the inter-packet time for packets output from controller 400 (FIG. 4) may be the same as the inter-packet time for packets input to controller 400 (FIG. 4). Consequently, controller 400 (FIG. 4) may be able to guarantee a known or predefined inter-packet time (and minimum-delayed packet latency) for all packets because the processing parameters do not need to be determined in real time (i.e., while the packets are being processed).

In an exemplary embodiment, without using an ASIC based and/or an FPGA-assisted design, the communication technique is used to achieve a high-performance packet rate in a software-based design. The resulting dataplane 500 (FIG. 5) may achieve 10 Gbps and 40 Gbps traffic rate on 10 G and/or 40 GNIC interfaces. This dataplane may also maintain the packet latency (i.e., the time span of a packet entering the box and when it leaves controller 400 in FIG. 4) as a constant regardless of the traffic utilization in the system.

Moreover, the software architecture of dataplane 500 (FIG. 5) may be independent of the multi-core processor that is used. For example, a Cavium multi-core processor (from Cavium, Inc. of San Jose, Calif.) or an Intel multi-core processor (from Intel, Inc. of Santa Clara, Calif.) may be used.

By using virtualization, dataplane module 510 (FIGS. 5 and 6) can be tuned or adapted to different bandwidth needs. Note that dataplane 500 (FIG. 5) may include multiple modules to achieve high performance. In particular, receive module 610 (FIG. 6) may not be involved in creating flow entries or in performing look ups for flow entries. It may parse the incoming packets to prepare meta data for the packets (such as for each packet). It may also hash the applicable user-equipment five tuple into a flow hash index. Slower traffic (such as dynamic host configuration protocol or DHCP, address resolution protocol or ARP, Internet Protocol version 6 or IPv6, layer 2, and packets from the KNI interface) may go to miscellaneous module 616 (FIG. 6). Faster traffic (such as Internet Protocol version 4 or IPv4, excluding DHCP) may go to software-processing module 612 (FIG. 6). Moreover, receive module 610 (FIG. 6) may enqueue these packets into an 'ingress queue' based upon the flow hash index modulo the number of software-processing modules. Note that software-processing module 612 (FIG. 6) may create and lookup flow entry, and may generate flow events for flow creation and flow verification to flow module 614 (FIG. 6).

In software-processing module 612 (FIG. 6), for each packet dequeued from the 'ingress queue,' a flow lookup may be performed and a new flow entry may be created if no matching flow entry is found. A flow event may be generated to flow module 614 (FIG. 6) if the flow is new. Moreover, a verification flow event may also be generated if the existing flow sees the packet in multiple of 128 packets or one second has passed from the last flow event. Note that the flow events may be generated regardless of the flow state.

As shown in FIG. 7, if the associated flow state is 'new,' the packet may go into a queue of type queue B 712 (a queue with flow state not 'up'). In particular, if the associated flow state is 'down,' (i.e., is directed to miscellaneous module 616 in FIG. 6) the packet may go into a queue of type queue B 712. Note that the number of queues of queue B 712 may be the same as the number of flow engines (e.g., the flow identifier modulo the number of flow engines). For all packets going into queue B 712, the 'pending_pkt_cnt' field may be incremented. This field may be used to prevent packets of the same flow from going out of order before flow going from the 'new' or 'down' state to the 'up' state.

Alternatively, if the associated flow state is 'up,' for a packet to go into a queue of type A 710 (a queue with flow state up), the 'pending_pkt_cnt' in the associated flow entry may need to be zero. Otherwise, the packet may go into queue B 712.

Packets in queue B 712 may be looked ahead (without dequeue) for the associated flow state, and the following conditions may be checked. If flow is still in 'new' state and the wait time is more than 5 ms, the packet may be de-queued and dropped. In this case, the 'pending_pkt_cnt' field may be decremented. Otherwise, the packet may stay in queue B 712. Moreover, if the flow is in 'down' state, the packet may be de-queued and dropped. In this case, the 'pending_pkt_cnt' field may be decremented. Furthermore, if the flow is in 'up' state, the packet may be de-queued and forwarded to transmit module 620 (FIG. 6), and the 'pending_pkt_cnt' field may be decremented.

In flow module 614 (FIG. 6), flow event may be generated by software-processing module 612 (FIG. 6) for the first packet of the flow or every two seconds of the flow at packet arrival. A flow may consist of a 5-tuple of key for lookup. For example, the 5-tuple may include: the source IP address, the destination IP address, the IP protocol, the layer 4 (L4) source port number, and/or the destination port number. Note that a flow is uni-directional. Moreover, flow module 614 (FIG. 6) will pre-calculate the egress tunnel encapsulation, quality-of-service treatment, and the prioritization of packet transmission for the flow. This information may be used directly by software-processing module 612 (FIG. 6) for packet forwarding when a packet arrives.

Furthermore, miscellaneous module 616 (FIG. 6) may process slow-path traffic. In general, traffic with the highest priority came here, such as: DHPC, ARP, keep alives, etc. Note that under high traffic volume, when the system needs to drop a packet, the fast-path packet may be dropped, and the slow-path (higher-prioritized traffic) may be kept and processed.

Note that dataplane module 510 (FIGS. 5 and 6) may provide a scalable architecture (such as from 10 G to 100 G capability) based on the number of cores assigned. Moreover, the inter-packet latency may be kept constant even with additional functionality and feature sets (once again, because the pre-calculated processing parameters eliminate the temporal variations that can occur when determining the processing parameters in software while processing packets). Furthermore, dataplane module 510 (FIGS. 5 and 6) may have a modular design so that code development can be done independently without entanglement. The modular design may include: an independent software-processing-module data path; a quality-of-service path; internal table management (such as ARP, bridging, routing, etc.); and/or out-of-band ARP, DHCP, multicast, and/or broadcast data paths.

Additionally, dataplane module 510 (FIGS. 5 and 6) may include: more subscriber-based quality-of-service features; routing capability (such as an open-shortest-path-first add-on to meet all kinds of requests for proposal from service providers); and/or managed virtual (VLAN) interfaces to simplify interface management. Note that the open shortest path first may interact with the virtual interface without the knowledge of the VLAN for simplification. Moreover, the datacore longest-prefix-match table may include mapped VLAN and other related information for encapsulation. This may replace an internal media-access-control bridging table, and the core side neighboring switch may not have to store a large number of user-equipment media-access-control entries. The virtualization of dataplane 500 (FIG. 5) may allow the use of a private cloud (which may have faster performance) or a public cloud.

Note that the modules in virtual machine 600 (FIG. 6) may be independent of each other, and may communicate through inter-module first-in first-out queues or shared memory structures. Moreover, a flexible number of cores may be specified to run. The software may automatically adjust and combine internal modules based on the number of cores provided or allocated to obtain optimal performance. Furthermore, there may be complete separation of data-path packets versus non-data packets. This may allow DHCP, ARP, IPv6 neighbor discovery, L2-type traffic, and KNI bound control traffic to be independently processed without impacting existing data-path performance. Additionally, dataplane 500 (FIG. 5) may maintain up to 100,000 user-equipment and 10,000 access-point tunnel capability regardless of the number of cores specified.

In an exemplary performance, the performance with one input/output (I/O) core is 1.2 million ("mil") packets per second ("pps"), or 3.5 mil pps with four I/O cores without tuning. Furthermore, for each added core, the performance may increase linearly by more than 50% performance. Each instance of receive module 610, software-processing module 612 and transmit module 620 (FIG. 6) combination in one core may provide 18 Gbps 1400 bytes packet performance.

We now describe embodiments of an electronic device, which may perform at least some of the operations in the communication technique. For example, the electronic device may include a controller that performs the operations in FIG. 1 or an access point (which may perform counterparts to the operations in FIG. 2). FIG. 8 presents a block diagram illustrating an electronic device 800 in accordance with some embodiments. This electronic device includes processing subsystem 810, memory subsystem 812, and networking subsystem 814. Processing subsystem 810 includes one or more devices configured to perform computational operations. For example, processing subsystem 810 can include one or more microprocessors, ASICs, microcontrollers, programmable-logic devices, and/or one or more digital signal processors (DSPs).

Memory subsystem 812 includes one or more devices for storing data and/or instructions for processing subsystem 810 and networking subsystem 814. For example, memory subsystem 812 can include dynamic random access memory (DRAM), static random access memory (SRAM), and/or other types of memory. In some embodiments, instructions for processing subsystem 810 in memory subsystem 812 include: one or more program modules or sets of instructions (such as program module 822 or operating system 824), which may be executed by processing subsystem 810. Note that the one or more computer programs may constitute a computer-program mechanism. Moreover, instructions in the various modules in memory subsystem 812 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 810.

In addition, memory subsystem 812 can include mechanisms for controlling access to the memory. In some embodiments, memory subsystem 812 includes a memory hierarchy that comprises one or more caches coupled to a memory in electronic device 800. In some of these embodiments, one or more of the caches is located in processing subsystem 810.

In some embodiments, memory subsystem 812 is coupled to one or more high-capacity mass-storage devices (not shown). For example, memory subsystem 812 can be coupled to a magnetic or optical drive, a solid-state drive, or another type of mass-storage device. In these embodiments, memory subsystem 812 can be used by electronic device 800 as fast-access storage for often-used data, while the mass-storage device is used to store less frequently used data.

Networking subsystem 814 includes one or more devices configured to couple to and communicate on a wired and/or wireless network (i.e., to perform network operations), including: control logic 816, an interface circuit 818 and one or more antennas 820 (or antenna elements). (While FIG. 8 includes one or more antennas 820, in some embodiments electronic device 800 includes one or more nodes, such as nodes 808, e.g., a pad, which can be coupled to the one or more antennas 820. Thus, electronic device 800 may or may not include the one or more antennas 820.) For example, networking subsystem 814 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, a transmit antenna radiation pattern of electronic device 800 may be adapted or changed using pattern shapers (such as reflectors) in one or more antennas 820 (or antenna elements), which can be independently and selectively electrically coupled to ground to steer the transmit antenna radiation pattern in different directions. Thus, if one or more antennas 820 includes N antenna-radiation-pattern shapers, the one or more antennas 820 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 814 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 800 may use the mechanisms in networking subsystem 814 for performing simple wireless communication between the electronic devices, e.g., transmitting advertising or beacon frames and/or scanning for advertising frames transmitted by other electronic devices as described previously.

Within electronic device 800, processing subsystem 810, memory subsystem 812, and networking subsystem 814 are coupled together using bus 828. Bus 828 may include an electrical, optical, and/or electro-optical connection that the subsystems can use to communicate commands and data among one another. Although only one bus 828 is shown for clarity, different embodiments can include a different number or configuration of electrical, optical, and/or electro-optical connections among the subsystems.

In some embodiments, electronic device 800 includes a display subsystem 826 for displaying information on a display, which may include a display driver and the display, such as a liquid-crystal display, a multi-touch touchscreen, etc.

Electronic device 800 can be (or can be included in) any electronic device with at least one network interface. For example, electronic device 800 can be (or can be included in): a desktop computer, a laptop computer, a subnotebook/netbook, a server, a tablet computer, a smartphone, a cellular telephone, a smartwatch, a consumer-electronic device, a portable computing device, an access point, a transceiver, a controller, a router, a switch, communication equipment, an access point, a controller, test equipment, and/or another electronic device.

Although specific components are used to describe electronic device 800, in alternative embodiments, different components and/or subsystems may be present in electronic device 800. For example, electronic device 800 may include one or more additional processing subsystems, memory subsystems, networking subsystems, and/or display subsystems. Additionally, one or more of the subsystems may not be present in electronic device 800. Moreover, in some embodiments, electronic device 800 may include one or more additional subsystems that are not shown in FIG. 8. Also, although separate subsystems are shown in FIG. 8, in some embodiments some or all of a given subsystem or component can be integrated into one or more of the other subsystems or component(s) in electronic device 800. For example, in some embodiments program module 822 is included in operating system 824 and/or control logic 816 is included in interface circuit 818.

Moreover, the circuits and components in electronic device 800 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 814. The integrated circuit may include hardware and/or software mechanisms that are used for transmitting wireless signals from electronic device 800 and receiving signals at electronic device 800 from other electronic devices. Aside from the mechanisms herein described, radios are generally known in the art and hence are not described in detail. In general, networking subsystem 814 and/or the integrated circuit can include any number of radios. Note that the radios in multiple-radio embodiments function in a similar way to the described single-radio embodiments.

In some embodiments, networking subsystem 814 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 822, operating system 824 (such as a driver for interface circuit 818) or in firmware in interface circuit 818. Alternatively or additionally, at least some of the operations in the communication technique may be implemented in a physical layer, such as hardware in interface circuit 818.

Moreover, while the preceding discussion illustrated the communication technique using a dataplane associated with a controller, more generally the communication technique (and, in particular, the dataplane module) may be used with an arbitrary electronic device. Furthermore, the approach of pre-calculating processing parameters so that a software module can obtain predictable performance may be applied to an arbitrary type of software (and thus is not limited to communications or a software implementation of an ASIC or an FPGA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A controller, comprising:
an interface circuit configured to communicate with one or more electronic devices;
a processor coupled to the interface circuit; and
memory, coupled to the processor, which stores program instructions, wherein, when executed by the processor, the program instructions cause the controller to process packets in a virtual dataplane with one or more virtual machines, and wherein a given virtual machine performs operations comprising:
receiving a given packet in a data flow on an input port;
processing the given packet using pre-calculated processing parameters, stored in the memory, for the packets in the data flow, wherein the pre-calculated processing parameters correspond to information associated with the data flow; and
after the processing, transmitting the given packet on an output port, wherein the given virtual machine maintains a fixed inter-packet time between packets in the data flow, so that the inter-packet time between the packets at the input port equals the inter-packet time between the packets at the output port.

2. The controller of claim 1, wherein the given virtual machine is executed by a preconfigured number of cores in the processor.

3. The controller of claim 1, wherein the pre-calculated processing parameters are based at least in part on one or more link performance metrics.

4. The controller of claim 1, wherein the pre-calculated processing parameters specify modifications to the packets in the data flow for use in subsequent processing of the packets in the data flow.

5. The controller of claim 1, wherein processing the given packet comprises modifying information in a header of the given packet based at least in part on one or more of the pre-calculated processing parameters.

6. The controller of claim 1, wherein the pre-calculated processing parameters comprise at least one of: an encapsulation parameter, a quality-of-service parameter, or a priority parameter.

7. The controller of claim 1, wherein the processing in the given virtual machine is implemented using multiple parallel pipelines, so that multiple packets in the data flow are processed concurrently.

8. A non-transitory computer-readable storage medium for use in conjunction with a controller, the computer-readable storage medium storing program instructions, wherein, when executed by the controller, the program instructions cause the controller to process packets in a virtual dataplane with one or more virtual machines by performing operations comprising:
receiving a given packet in a data flow on an input port;
processing the given packet using pre-calculated processing parameters, stored in the memory, for the packets in the data flow, wherein the pre-calculated processing parameters correspond to information associated with the data flow; and
transmitting, after the processing, the given packet on an output port, wherein the given virtual machine maintains a fixed inter-packet time between packets in the data flow, so that the inter-packet time between the packets at the input port equals the inter-packet time between the packets at the output port.

9. The computer-readable storage medium of claim 8, wherein the given virtual machine is executed by a preconfigured number of cores in a processor in the controller.

10. The computer-readable storage medium of claim 8, wherein the pre-calculated processing parameters are based at least in part on one or more link performance metrics.

11. The computer-readable storage medium of claim 8, wherein the pre-calculated processing parameters specify modifications to the packets in the data flow for use in subsequent processing of the packets in the data flow.

12. The computer-readable storage medium of claim 8, wherein processing the given packet comprises modifying information in a header of the given packet based at least in part on one or more of the pre-calculated processing parameters.

13. The computer-readable storage medium of claim 8, wherein the pre-calculated processing parameters comprise at least one of: an encapsulation parameter, a quality-of-service parameter, or a priority parameter.

14. The computer-readable storage medium of claim 8, wherein the processing in the given virtual machine is implemented using multiple parallel pipelines, so that multiple packets in the data flow are processed concurrently.

15. A method for processing packets in a virtual dataplane with one or more virtual machines in a controller, wherein the method comprises:
by the controller:
receiving a given packet in a data flow on an input port;
processing the given packet using pre-calculated processing parameters, stored in the memory, for the packets in the data flow, wherein the pre-calculated processing parameters correspond to information associated with the data flow; and transmitting, after the processing, the given packet on an output port, wherein the given virtual machine maintains a fixed inter-packet time between packets in the data flow, so that the inter-packet time between the packets at the input port equals the inter-packet time between the packets at the output port.

16. The method of claim 15, wherein the given virtual machine is executed by a preconfigured number of cores in a processor in the controller.

17. The method of claim 15, wherein the pre-calculated processing parameters specify modifications to the packets in the data flow for use in subsequent processing of the packets in the data flow.

18. The method of claim 15, wherein the pre-calculated processing parameters comprise at least one of: an encapsulation parameter, a quality-of-service parameter, or a priority parameter.

19. The method of claim 15, wherein the pre-calculated processing parameters are based at least in part on one or more link performance metrics.

20. The method of claim 15, wherein processing the given packet comprises modifying information in a header of the given packet based at least in part on one or more of the pre-calculated processing parameters.

* * * * *